(12) United States Patent
Gledhill, III et al.

(10) Patent No.: US 8,639,363 B2
(45) Date of Patent: Jan. 28, 2014

(54) COMPONENT CONTROL SYSTEM

(75) Inventors: Robert Gledhill, III, Huntingdon Beach, CA (US); John Nguyen, Yorba Linda, CA (US); William M. McDowell, Garden Grove, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 320 days.

(21) Appl. No.: 12/973,743

(22) Filed: Dec. 20, 2010

(65) Prior Publication Data

US 2011/0153031 A1 Jun. 23, 2011

Related U.S. Application Data

(60) Provisional application No. 61/288,770, filed on Dec. 21, 2009.

(51) Int. Cl.
*G05B 11/01* (2006.01)
*G05B 15/02* (2006.01)

(52) U.S. Cl.
USPC ................................. 700/8; 700/12; 700/282

(58) Field of Classification Search
USPC ............ 700/8, 12, 3, 282, 283, 285; 417/6, 7, 417/12, 216, 426; 128/DIG. 13; 604/30, 31, 604/67, 151
See application file for complete search history.

(56) References Cited

U.S. PATENT DOCUMENTS

| | | | |
|---|---|---|---|
| 4,756,706 A | 7/1988 | Kerns et al. | |
| 4,898,578 A | 2/1990 | Rubalcaba, Jr. | |
| 5,213,571 A | 5/1993 | Fujio et al. | |
| 5,256,157 A | 10/1993 | Samiotes et al. | |
| 5,259,731 A * | 11/1993 | Dhindsa et al. | 417/6 |
| 5,547,470 A * | 8/1996 | Johnson et al. | 604/67 |
| 5,556,378 A | 9/1996 | Storz et al. | |
| 6,544,228 B1 | 4/2003 | Heitmeier | |
| 6,783,328 B2 | 8/2004 | Lucke et al. | |
| 6,879,876 B2 | 4/2005 | O'Dougherty et al. | |
| 7,556,611 B2 | 7/2009 | Kolenbrander et al. | |
| 2002/0150476 A1* | 10/2002 | Lucke et al. | 417/2 |

OTHER PUBLICATIONS

Copending applications cited by the Applicants in the cover letter for this Information Disclosure Statement dated Apr. 15, 2011.

* cited by examiner

*Primary Examiner* — Sean P. Shechtman
*Assistant Examiner* — Steven Garland
(74) *Attorney, Agent, or Firm* — Knobbe Martens Olson & Bear LLP

(57) ABSTRACT

A system and method are provided for managing a plurality of components. The system can comprise a first component having a first operational parameter and a second component having a second operational parameter. The operational parameters of the first and second components can be modified in response to signals regarding the other one of the first and second components. Further, a component of the system can operate with a delay period during which an operational parameter of the component does not change in response to an operational parameter of the other component, but after which the operational parameter of the other component can cause a change in the operational parameter of the component.

22 Claims, 10 Drawing Sheets

COMPONENT CONTROL SYSTEM

CROSS-REFERENCE TO RELATED APPLICATIONS

This application claims the benefit of U.S. Provisional Application No. 61/288,770, filed Dec. 21, 2009, the entirety of which is incorporated herein by reference.

BACKGROUND

1. Field of the Inventions

The present inventions relate to control systems, and more specifically to control systems for use with positive displacement pumps.

2. Description of the Related Art

Positive displacement pumps, such as metering pumps, can be used to pump liquids at adjustable flow rates which are precise when averaged over time. Metering pumps include diaphragm metering pumps, peristaltic metering pumps, piston pumps, etc. A peristaltic roller pump typically has three or more rollers, but may have other configurations. The rollers are generally spaced circumferentially evenly apart and are generally mounted on a rotating carrier that moves the rollers in a circle. A length of flexible tubing is typically placed between the rollers and a semi-circular wall. In medical applications, the tubing can be a relatively soft and pliable rubber tubing. For relatively high pressure industrial applications, however, the tubing can be exceedingly durable and rigid, albeit flexible under the high pressure of the rollers.

In use, the rollers rotate in a circular movement and compress the tubing against the wall, squeezing the fluid through the tubing ahead of the rollers. The rollers are configured to almost completely occlude the tubing, and operate essentially as a positive displacement pump, each passage of a roller through the semicircle pumps the entire volume of the fluid contained in the tubing segment between the rollers.

As a positive displacement pump, relatively high positive pressures (e.g., up to 125 psi) can be generated at the pump outlet. Peristaltic roller pumps are typically driven by a constant speed motor that draws fluid at a substantially constant rate.

SUMMARY

Positive displacement pumps, and metering pumps in particular, play a significant role at waterworks for disinfecting potable water, along with sewage treatment plants, swimming pools and many other industries. In some cases, during the chemical treatment process, two or more chemicals are injected that are dependent on one-another to create a desired chemical reaction. If one of the chemicals is not present at any time, then the desired result is unattainable, and in some cases, this can result in a hazardous situation.

The present inventions relate to pumps and more particularly to control systems that can be used with positive displacement pumps to provide accurate monitoring and activation of a system of positive displacement pumps. The positive displacement pumps can include, for example, one or more metering pumps such as peristaltic pumps, diaphragm pumps, piston pumps, etc., which can all be used in embodiments disclosed herein. Embodiments disclosed herein can enable the precise dispersion of fluids and/or chemicals while monitoring for any failures or stoppage in the system. In some embodiments, a method and system are provided for monitoring and/or managing a feedback circuit of a system of interdependent components, such as positive displacement pumps, in a master-slave relationship. In some embodiments, the system provides "on" or "off" signals to the components that control an operation of the components.

In accordance with some embodiments, methods and systems are provided for enabling reliable and efficient functioning of a plurality of components that are interconnected in a feedback loop. In such embodiments, the components can relay signals with each other and respond based on the signals received. The system can comprise two or more components having at least one operational parameter that is dependent on at least one operational parameter of at least one other component of the system. The operational parameter can relate to whether the component operates at a given speed, flow rate, frequency, power, and/or at all.

For example, the system can be configured to allow all components to operate if all components are functioning properly; however, if a component of the system malfunctions in some manner, the system can provide an "off" signal to one or more of the components of the system to cause one or more of the components to cease operation.

In some embodiments, where all components of the system are "on" if all components are functioning, or "off" if at least one of the components is not functioning properly, the system can be configured such that at least one of the components operates on a delay. The delay can allow a component to begin operation even though an "off" signal may be sent to the component. Such a feature can be especially useful if the components are interconnected in a feedback loop. The delay of reception of a signal from another component can last for a predetermined period during operation of the system (which can be referred to as "initialization delay") that commences upon initialization of the system and ends prior to cessation of operation of the system. However, the system can also be configured such that the reception of a signal from another component is always delayed (which can be referred to as "permanent delay").

For example, in a two-component system with a feedback loop, instead of being turned "off" in response to an "off" signal from the inactive component, a component can become active and begin operation, thereby beginning an "on" cycle in which the inactive component can receive an "on" signal from the now-active component. During the delay of the active component, the inactive component can begin operation and thereafter send an "on" signal, which can be sent to the active component to thereby maintain the active component in a functioning state. However, should one of the components thereafter malfunction in some manner, an "off" signal can be sent to the other component to cause the other component to cease operation. Thus, in some embodiments having an "initialization delay," the "off" signal can be generally immediately received and acted on generally immediately by the other component. However, in embodiments having a "permanent delay," the reception of the "off" signal by the other component can be delayed, thus allowing the other component to respond only after the delay has passed, which may result in a time delay of a few seconds before the "off" signal is received and causes the other component to cease operation. The other component can thereafter send an "off" signal to the malfunctioning component to cause the malfunctioning component to cease operation.

Further, in some embodiments, the system can comprise three or more components. The system can also be configured such that one or more of the components operates on a delay. Additionally, the system can be configured such that the components are interconnected to communicate in a feedback loop. A component of the system can comprise, for example, a positive displacement pump, such as a metering pump.

Some embodiments can be provided that relate to pumps and more particularly to system of metering pumps that can inject two or more chemicals. The system can be configured such that each pump shuts down the other pump(s) if the pump fails to pump fluid for any reason.

Further, the system can be configured such that variable output signals are relayed between a master pump and at least one slave pump. Further, if a pump is not operating or has failed, an output signal can be sent to the other pump, which can cause the other pump to stop working as well. The system can be configured such that the output signal can be sent directly from the pump that is not operating to the other pump. However, the system can also be configured such that the output signal can be sent from an external source, such as a controller or local touchpad that is in communication with each of the pumps.

For example, the master pump can be controlled via an incoming signal from the external source. However, the system can be configured such that the slave pump has override control if the slave pump stops pumping. Override control refers to the ability of the slave pump to cause the master pump to cease operation if the slave pump malfunctions in some manner. Thus, although the slave pump is controlled via the master pump, if the slave pump stops pumping for whatever reason, the master pump will also shut-down.

Therefore, in accordance with an embodiment, a system is provided that can comprise a first component and a second component. The first component can have a first operational parameter. The second component can have a second operational parameter. The second component can receive a signal representative of the first operational parameter of the first component. Further, the system can be configured such that a change in the first operational parameter causes a change in the second operational parameter. Furthermore, the system can be configured such that the first component operates with a delay period during which the second operational parameter is not operative to cause a change in the first operational parameter and after which the second operational parameter is operative to cause a change in the first operational parameter.

In some embodiments, the system can be configured such that the first operational parameter comprises at least one of a functioning state and a nonfunctioning state. Further, the second operational parameter can comprise at least one of a functioning state and a nonfunctioning state. Furthermore, the nonfunctioning state of the first and second components can comprise improper functioning of the respective first and second components. In addition, the first and second components can be interconnected to communicate in a feedback loop.

The system can further comprise a third component having a third operational parameter. A change in one of the first operational parameter and the second operational parameter can cause a change in the third operational parameter. Further, the system can be configured with the first component operating with the delay period during which a change in the third operational parameter does not cause a change in the first operational parameter and after which a change in the third operational parameter causes a change in the first operational parameter. In addition, the first, second, and/or third components can be interconnected to communicate in a feedback loop.

Additionally, the system can be configured such that the delay period corresponds to an amount of time. The delay period can also correspond to an amount of time necessary to complete an operational task, such as achieving a given number of revolutions, a given flow volume, a given flow rate, a given RPM, and other such parameters that might be related to the functioning and/or operation of the system or its components. Moreover, the delay period may be available only upon initialization of the operational state of the first component while the second component is in the nonfunctioning state.

In accordance some embodiments, the system can be configured to comprise a master component and a slave component. The master component can have an operational state comprising at least an on state and an off state. The slave component can have an operational state comprising at least an on state and an off state. Further, the slave component can receive a master signal being representative of an operational state of the master component. The system can be configured such that the slave component operates in the off state in response to a master signal indicating that the master component is operating in the off state. Further, the system can be configured such that the master component comprises a delay feature that allows the master component to operate in the on state for a given period even if the slave component is in the off state. Furthermore, after the given period, the master component can operate in the off state if the second component operates in the off state.

In some embodiments, the system can be configured such that the master component sends the master signal to the slave component. Further, the system can also be configured such that the off state of the first and second components comprises improper functioning of the respective first and second components. In addition, the master and slave components can be interconnected to communicate in a feedback loop.

In accordance with some embodiments, a method for managing a plurality of components is provided that comprises: providing a first output signal from a first component during a feedback period, wherein the first output signal is representative of at least one operating parameter of the first component; providing a second output signal from a second component during the feedback period, wherein the second output signal is representative of at least one operating parameter of the second component; conveying the first output signal such that at least one operational parameter of the second component is managed in response to the first output signal during the feedback period; and conveying the second output signal after a delay period for managing at least one operational parameter of the first component in response to the second output signal during the feedback period. For example, the method can be implemented such that wherein the step of providing a first output signal is performed continuously and the step of providing a second output signal is performed continuously. Further, the method can also be implemented such that the step of conveying the first output signal is performed immediately upon generation of the first output signal.

Some embodiments of the method can be implemented such that the delay period is shorter than the feedback period. Further, the method can be implemented with the operational parameter of the first component comprising at least one of a functioning state and a nonfunctioning state. The system can also be implemented with the operational parameter of the second component comprising at least one of a functioning state and a nonfunctioning state.

The method can be modified such that the step of continuously providing a first output signal comprises sending the first output signal to the second component. Further, the system can also be modified such that the step of continuously providing a second output signal comprises sending the second output signal to the first component.

In some embodiments, the method can further comprising the steps of: continuously providing a third output signal from a third component during the feedback period; immediately conveying the third output signal such that at least one operational parameter of the second component is managed in response to the third output signal during the feedback period; and during the feedback period, managing at least one operational parameter of the third component in response to one of the first output signal and the second output signal. Further, the method can be modified such that the step of managing at least one operational parameter of the third component comprises managing at least one operational parameter of the third component in response to the first output signal. Additionally, the method can also comprise the step of: conveying the third output signal after a delay period for managing at least one operational parameter of the first component in response to the third output signal during the feedback period. Further, the first, second, and/or third components can be interconnected to communicate in a feedback loop.

The components used in the system or method can include one or more positive displacement pumps, such as a metering pump, including a diaphragm pump, a peristaltic pump, and/or a piston pumps. The components can also be different from each other or the same as each other in the system and/or method.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures.

DETAILED DESCRIPTION

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Embodiments of these systems, apparatuses, and methods disclosed herein provide effective solutions to managing and monitoring a plurality of components. The components can operate in a manner that makes one or more of the operational parameters of one or more of the components interdependent on another operational parameter of one or more of the components. The components can communicate directly with each other in a feedback loop and/or through an external source, such as a controller or touch pad. At least one of the components can be configured to comprise a delay feature that enables the component to initiate an operation and/or continue in operation in the absence of an enabling signal.

For example, in an embodiment, a system is provided in which the components operate simultaneously (thus, no single component operates alone). The components can be set up in a feedback loop such that the components or sensors thereof communicate at least one operational parameter to each other. Accordingly, the components or sensors can exchange operational signals that are representative of at least one operational parameter of the respective component or sensor.

Figure 1:
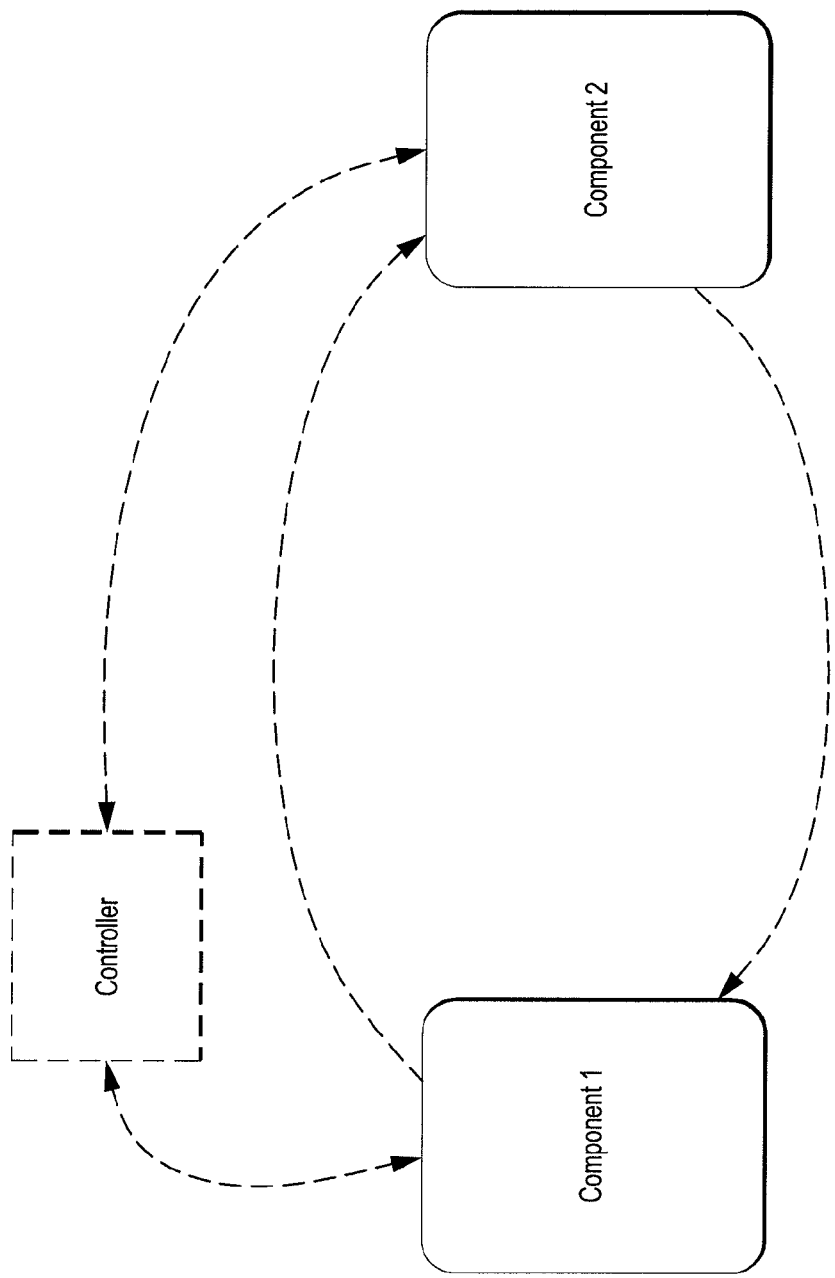
FIG. 1 is a schematic representation of a system of components, according to an embodiment.

In a feedback loop system in the embodiment illustrated in FIG. 1, a first component will not be able to operate if it can only commence operation upon receiving an enabling signal from a second component (such as a signal that indicates that the second component is operating) when the second component can only commence operation upon receiving an enabling signal from the first component (such as a signal that indicates that the first component is operating). In order to address such a problem, according to embodiments disclosed herein, the system can be configured such that at least one component comprises a delay feature that allows the component to commence operation in the absence of an enabling signal for a given period.

Additionally, any of the embodiments disclosed herein can be modified such that the method or the system can be configured such that the components can send and/or receive any variety of signals. A signal can enable at least one operational parameter of a component to be functional and/or commence operation. Further, a signal can disable or cause a cessation and/or change of at least one operational parameter of a component. A signal can also provide enablement of a given operational parameter and cause cessation of another operational parameter. Furthermore, a signal can also relate to a specific feature, function, and/or other operational parameter of a component and/or two whether a component commences, ceases, or continues operating. Thus, a signal can provide a variety of information regarding a given component of the system and can be provided be the given component or by a source external to the component.

In any of the embodiments disclosed herein, a signal can relate to operational parameters of the system. An operational parameter can include, without limitation, how and/or whether the system and/or a component of the system works. For example, in embodiments relating to pumps, an operational parameter can relate to the speed (RPM), flow rate, number of cycles or rotations, frequency, volume, concentration, power, resistance, malfunctions (such as in the motor, tubing, and/or other features of the pump), and/or whether the pump is operating and/or is "on" or "off" (or "running" or "stopped"). Further, a signal can be sent continuously or intermittently by one or more components of the system and/or the external source.

In some embodiments, a "turn off" output signal can be representative of a situation in which a first component is not working only because a second component is not working. As will be apparent to a person of skill, in embodiments that incorporate a delay feature, such a "turn off" output signal can be interpreted and/or ignored by the controller and/or first (or master) component if the first component is functioning in order to allow the second (or slave) component to receive a "turn on" signal from the first component. Accordingly, once the second component turns on, the output signal of the second component can change to a "turn on" output signal. However, a "turn off" output signal can also be representative of a situation in which the second component has malfunctioned. In such an embodiment, such a "turn off" output signal can be interpreted by the controller or first component as a directive to turn off. In this manner, signals can be interpreted and include varying levels of detail and information to be processed by the controller and/or receiving components.

In some embodiments, signals can also be relayed between the components and/or a controller or external source. For example, a controller shown in FIG. 1 can optionally be provided in order to control one or more operational parameters of component 1 and component 2. The controller can optionally be provided with systems having a feedback loop in which the components of the system communicate with each other.

In some embodiments, a first component can commence operation and ignore any signal regarding a second component for a delay period. The delay period can correspond to any variety of periods, such as an elapsed amount of time and/or satisfaction of a condition, such as achieving an operational parameter of the system and/or one or more components of the system or external source.

In some embodiments, the delay period can represent a period of time in which a signal regarding the second component is discarded or ignored, and after which a signal regarding the second component is processed and/or responded to by the first component. In such embodiments, optionally, only a signal regarding the second component that is transmitted and/or generated after the delay period is processed and/or responded to by the first component. The delay period can expire after a finite time at the commencement or recommencement of operation, for example, and therefore does not influence operation after the system after the delay period expires.

For example, when the system is activated (for example, at time=0 seconds), the first component can ignore any signal regarding the second component until the end of the delay period (for example, at time=4 seconds), and after the delay period expires, any signal regarding the second component is processed and/or responded to by the first component while any signal received during the delay period is not processed and/or responded to.

With reference to FIG. 1, in embodiments wherein the components are pumps, for example, when a certain amount of time has elapsed, when a certain RPM is reached, when a certain flow rate is achieved, and/or when a certain number of revolutions have been achieved, component 1 can reach the end of the delay period and cease ignoring signals from component 2. By the end of the delay period, component 2 will have received an enabling signal from component 1, thus causing component 2 to send an enabling signal to component 1. As noted above, the enabling signal can be as simple as an indication that the component is now operating or functioning. Thus, the delay period can allow component 1 to continue operating or functioning long enough to cause component 2 to receive an enabling signal and begin operating or functioning.

However, in some embodiments, the delay period can represent a period that passes between the transmission and/or generation of a signals regarding the second component and the processing and/or responding to by the first component. In such embodiments, optionally, each signals regarding the second component can be processed and/or responded to by the first component, but only after the delay period. Thus, the delay period can represent a waiting period for the processing and/or responding to by the first component, for example, and therefore can always influence the operation of the system when the system is active.

For example, when the system is activated (for example, at time=0 seconds), the first component can process and/or respond to any signal regarding the second component after the delay period passes for that particular signal (for example, for a delay period of 4 seconds, at time=4 seconds for a signal sent at time=0 seconds, at time=5 seconds for a signal sent at time=1 second, at time=10 seconds for a signal sent at time=6 seconds, etc.). As such, all signals regarding the second component can be processed and/or responded to after the delay period. In such embodiments, the first component and/or an external source can also evaluate an appropriate response to the signal depending on the time the signal is sent, the content of the signal, and other factors (for example, such as to evaluate and determine not to turn off the first component in response to the signal regarding the second component because the signal was sent before the second component received an "on" or "off" signal regarding the first component).

Accordingly, such embodiments can allow the system to overcome the stoppage or tripping that would otherwise be present due to the feedback loop between the components. This advantageous feature therefore allows a simple feedback loop system to be operational and effective, while allowing the components of the system to effectively communicate operational problems or disabling signals should one of the components malfunction in any way.

Figure 2:
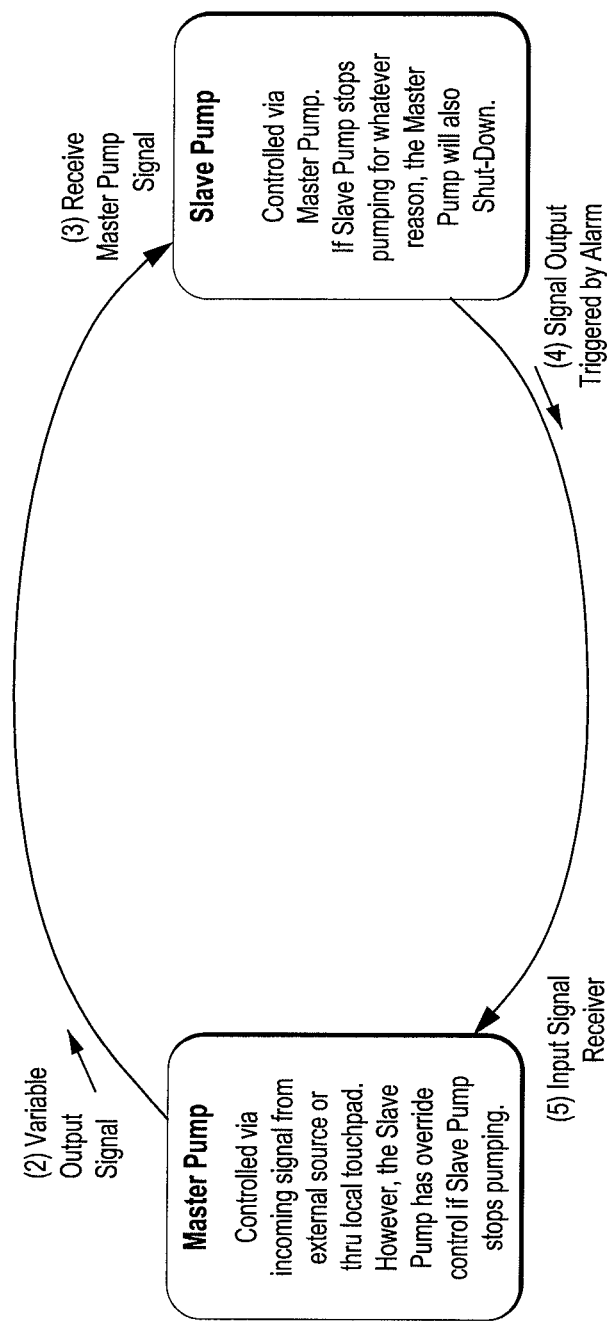
FIG. 2 is a schematic representation of a system of pumps, according to an embodiment.

FIG. 2 illustrates an embodiment of a system having a master pump and a slave pump that can function according to the principles discussed above with respect to FIG. 1. As shown, the master pump can be controlled by an incoming signal from an external source or through a local touchpad. Thus, an operator can manipulate one or more of the operational parameters of the master pump.

When the master pump commences operation, it can output a variable output signal that is received at the slave pump. This variable output signal or master pump signal can enable or allow the slave pump to commence operation. Thus, the slave pump can be controlled by the master pump. However, if the slave pump stops pumping for whatever reason, the slave pump can send an output signal that is received as an input signal at the master pump that causes the master pump to cease operation.

In some embodiments, the master pump and the slave pump can comprise a transmitter, a receiver, and/or a transceiver. The master pump and the slave pump can output signals to each other in a feedback loop. The signals can be output on a continuous basis, but can also be output in response to one or more operational parameters.

Figure 3:
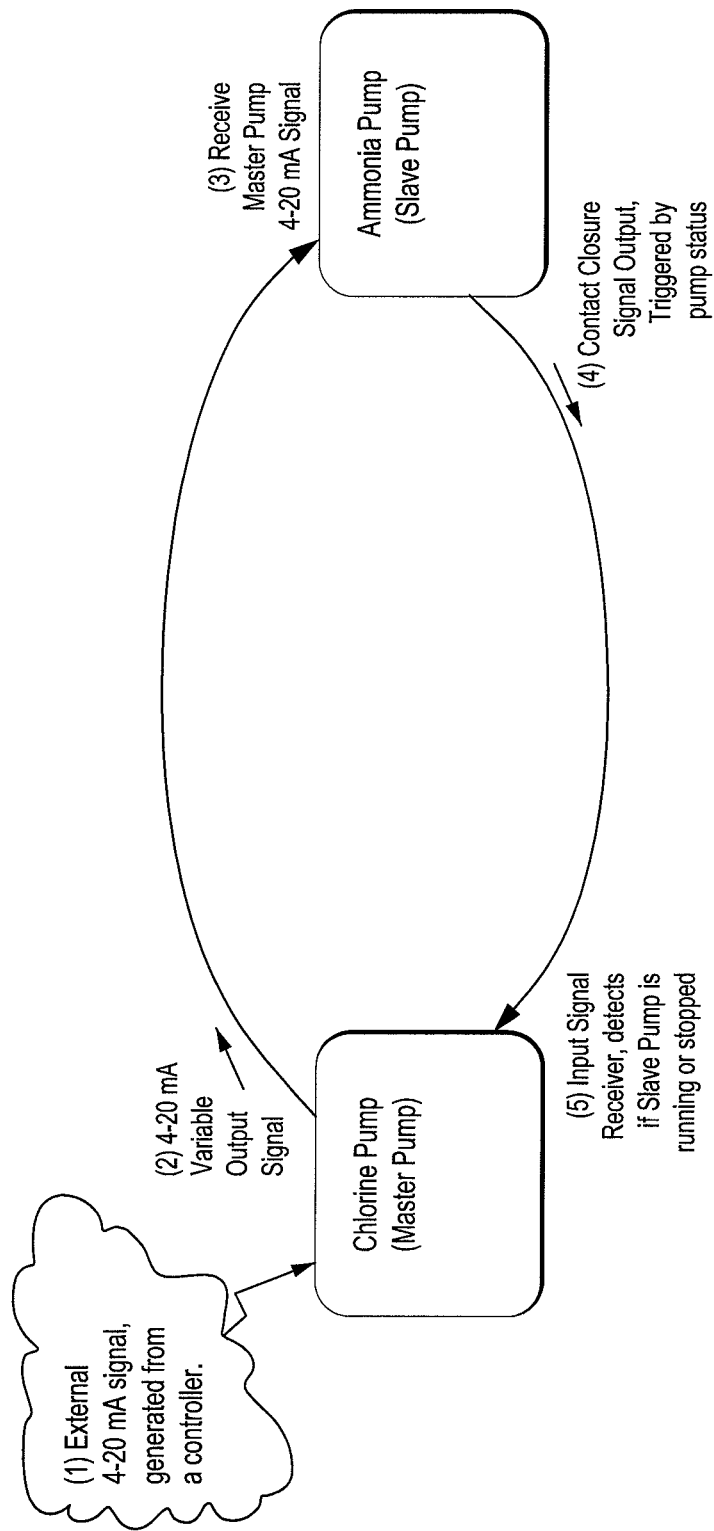
FIG. 3 is a schematic representation of another system of pumps in an industrial application, according to an embodiment.

FIG. 3 is an embodiment of a system for use in a municipal water treatment application.

In such applications, the system is used to disinfect potable water using chloramines. A method of increasing the length of time that the chlorine remains effective in the system is to add ammonia. With the addition of ammonia, chloramines are formed, resulting in not only a more stable and longer lasting disinfection residual than free chlorine, but also the additional benefit of a reduction in the amount of initial chlorine injection required and a similar reduction in unpleasant chlorine odor and taste. Although the mixing of ammonia with chlorine to form chloramines is a safe and effective means to treat drinking water, the addition of ammonia can create a potential hazard if the chlorine is not present. The proper chlorine/ammonia ratio must be maintained to form the chloramines.

Thus, the system illustrated in FIG. 3 utilizes metering pumps controlled using a controller (i.e., ORP, PH, flow meter or other). Depending on the water chemistry or flow rate, the controller will speed up or slow down the chlorine pump via a signal (1) (such as a 4-20 mA signal or other suitable signal).

Element (2) represents a Chlorine Pump signal that is used to control the output of the Ammonia Pump via a signal (such as a 4-20 mA signal or other suitable signal) which is proportional to the speed of the Chlorine Pump. It is critical that the Ammonia Pump inject at a proportional rate with the Chlorine Pump and automatically deactivate if the Chlorine Pump should stop pumping for any reason.

Element (3) represents that the Ammonia Pump receives the 4-20 mA signal and dispenses ammonia at a pre-programmed ratio relative to the Chlorine Pump. The Ammonia Pump is completely controlled by the Chlorine Pump through the 4-20 mA signal. If the Chlorine Pump slows down or stops, then the Ammonia Pump will slow down or stop, depending on the Chlorine Pump.

Element (4) represents the use of a Contact Closure, the Ammonia Pump will send a "Run" or "Stop" status to the Chlorine Pump. If the Ammonia Pump switches from running to stopped (i.e. tube failure, STOP button pressed, etc.), then the state of the Contact Closure changes from open to close, or close to open, depending on application.

Element (5) represents that the Chlorine Pump is in "Remote Start/Stop" mode, which is wired to the Contact Closure output of the Ammonia Pump. The Chlorine Pump is controlled by the incoming signal (such as a 4-20 mA signal or other suitable signal) from an external source (controller) and the "Remote Start/Stop" (Ammonia Pump). The "Remote Start/Stop" takes precedence over the "input signal." In order for the closed loop to initialize, the "Remote Start/Stop" shall have a time delay. The delay can be short (2-3 seconds), but is required to initialize the system. For example, if the Ammonia Pump stops pumping, the Chlorine Pump will stop 2-3 seconds later. The metering pump system can therefore be configured in a closed loop in which both pumps will monitor the other and react accordingly.

Figure 4:
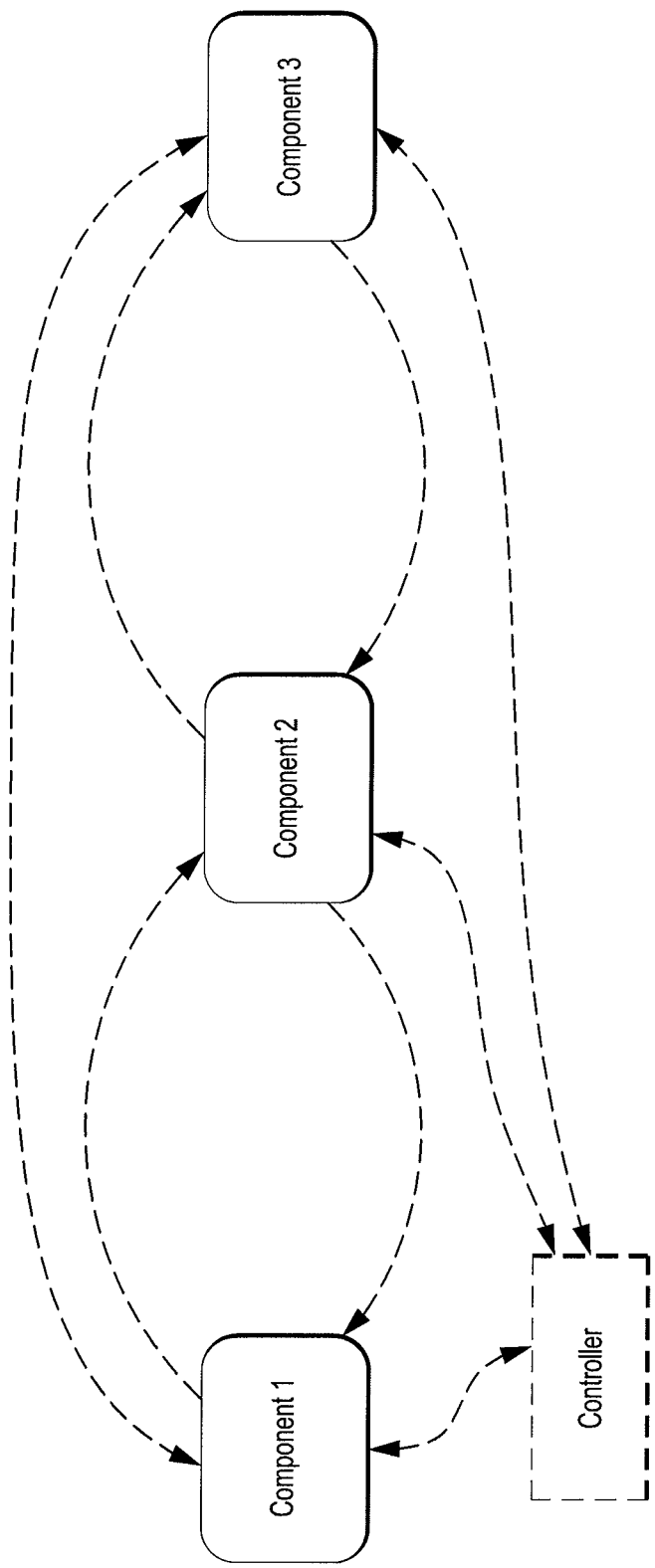
FIG. 4 is another schematic representation of a system of components, according to another embodiment.
Figure 5:
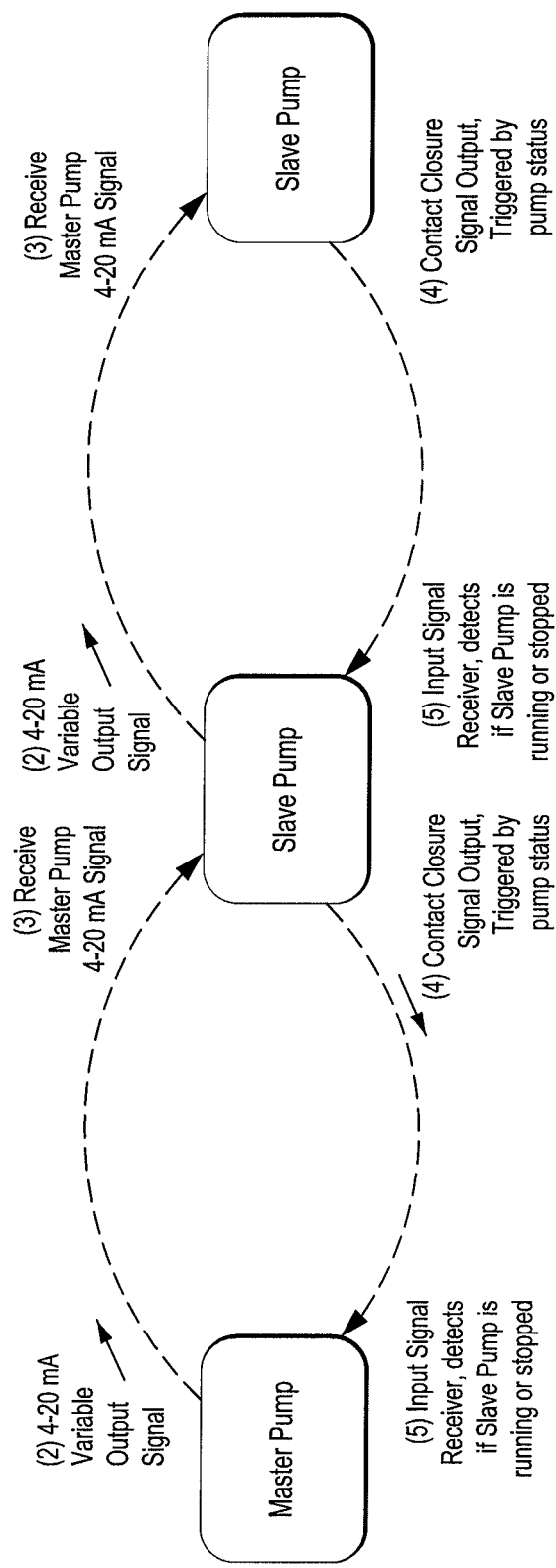
FIG. 5 is a schematic representation of another system of pumps, according to an embodiment.

FIGS. 4-5 illustrate embodiments of the system that incorporate three components or pumps. In such embodiments, the principles discussed above with respect to FIGS. 1-3 can also be employed. Accordingly, the above discussion is incorporated here by reference, but will not be repeated here for sake of brevity. However, as illustrated in FIG. 4, the components can exchange signals in a variety of patterns. As shown by the innermost dashed arrows, the components can form a feedback loop in which the components communicate in series. However, the components can also communicate in parallel with each other. Further, the components can also communicate with an optional external source or controller that can be used to manage or control at least one operational parameter of at least one of the components. In such embodiments, the system can include a delay feature, as discussed above.

FIG. 5 illustrates a master-slave relationship between three pumps. This configuration can work in many metering pump applications and with multiple pumps. This example shows the Master Pump being controlled locally (not using 4-20 mA input signal from an external source). As the operator speeds up or slows down the Master Pump using the touchpad controls, the Slave Pumps adjust output accordingly. However, if any pump fails or stops running, all pumps will shut down. Further, with a delay feature incorporated into such a system in the Master Pump, the Master Pump must be the first pump to start up.

Figure 6:
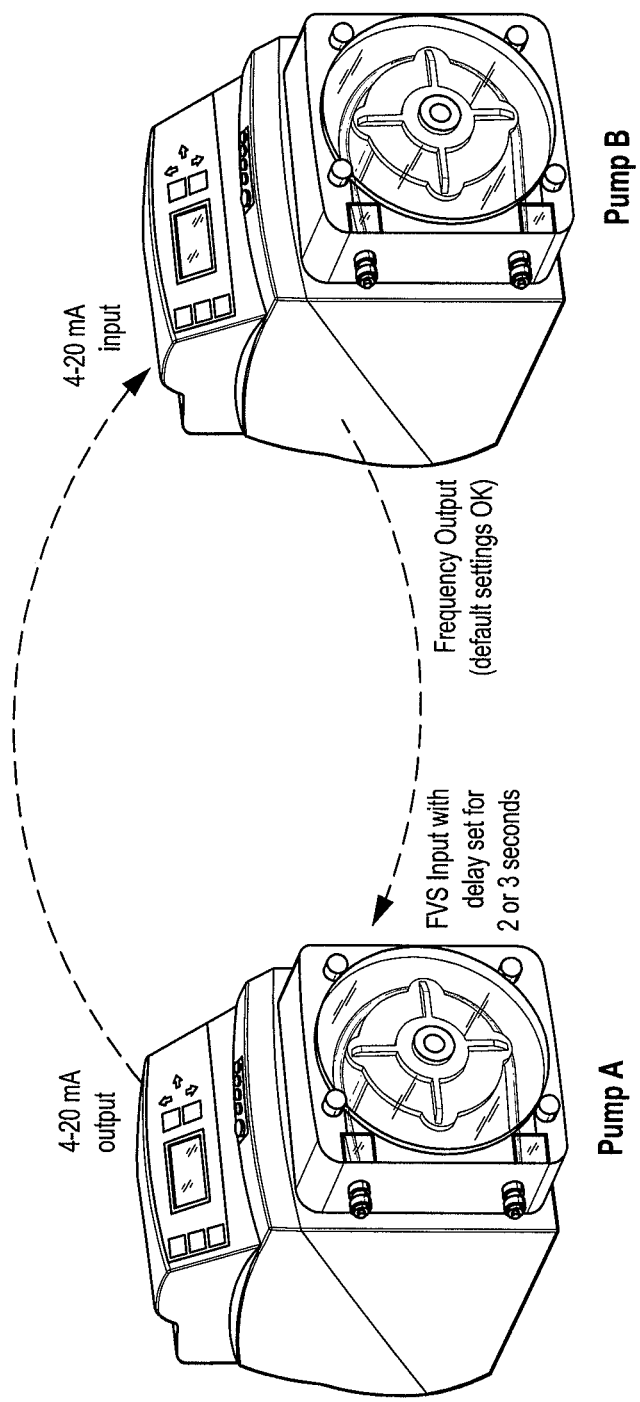
FIG. 6 is another schematic representation of a system of pumps, according to an embodiment.
Figure 7:
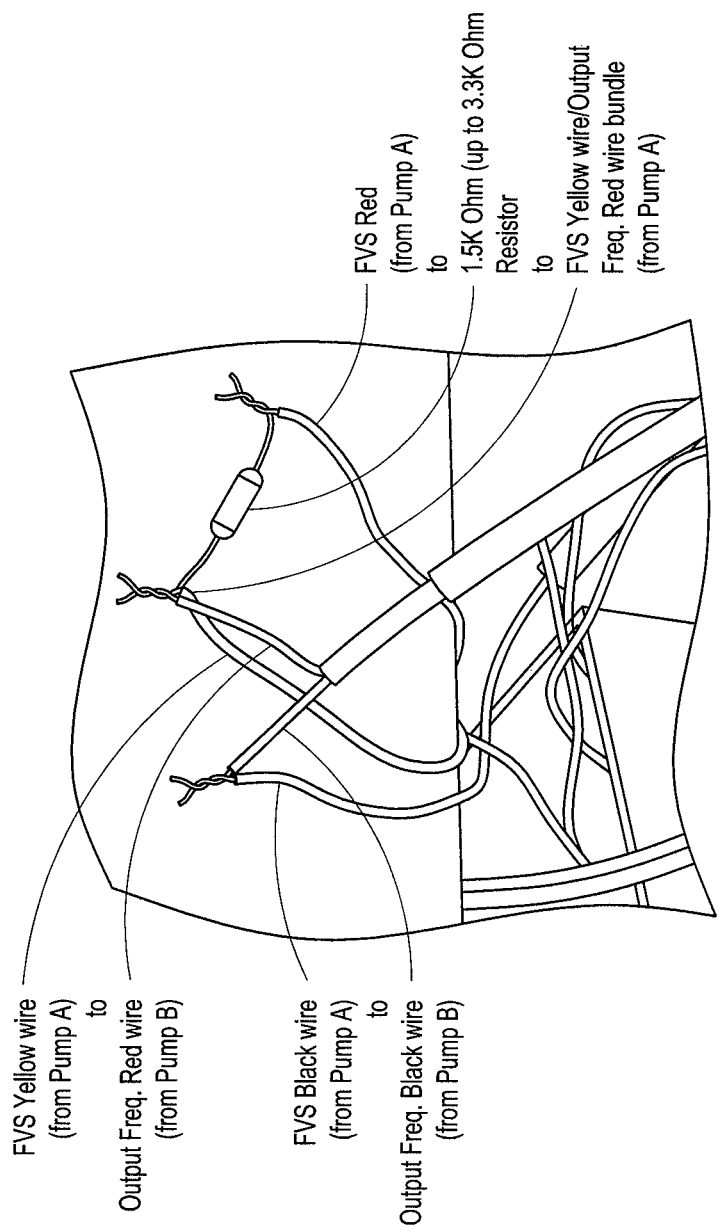
FIG. 7 is a view of a wiring assembly for operating a system of pumps, according to an embodiment.

FIG. 6 illustrates an embodiment utilizing peristaltic pumps A, B. Although a peristaltic pump is shown in some of the embodiments by way of example, other types of pumps, such as metering pumps including diaphragm pumps and piston pumps can also be used in the disclosed embodiments. Similar to the embodiments discussed above, the embodiment shown in FIG. 6 utilizes an output signal and an input signal communicated between the pumps in a feedback loop. The input signal to pump A is on a delay set for two to three seconds. FIG. 7 illustrates a view of a wiring assembly for operating a system of pumps such as that shown in FIG. 6.

Figure 8:
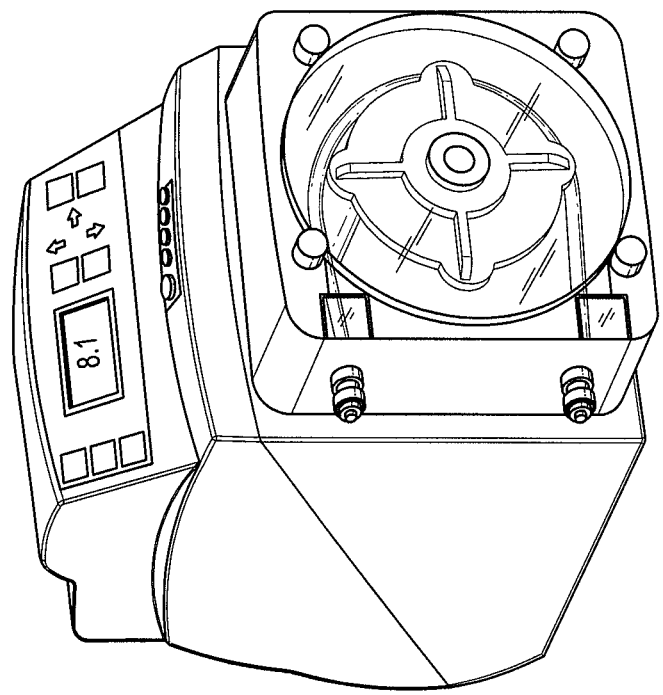
FIGS. 8-10 are views of a system of pumps wherein the system is in various operational states, according to an embodiment.
Figure 8:
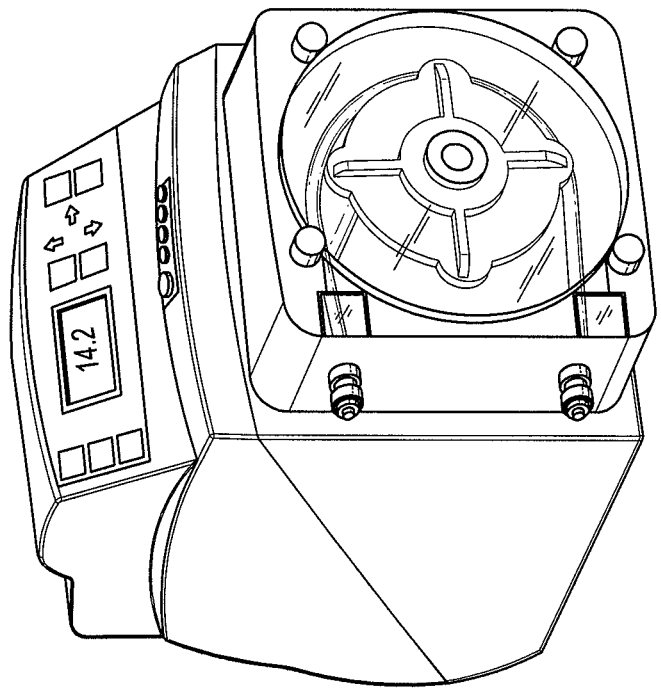
Figure 9:
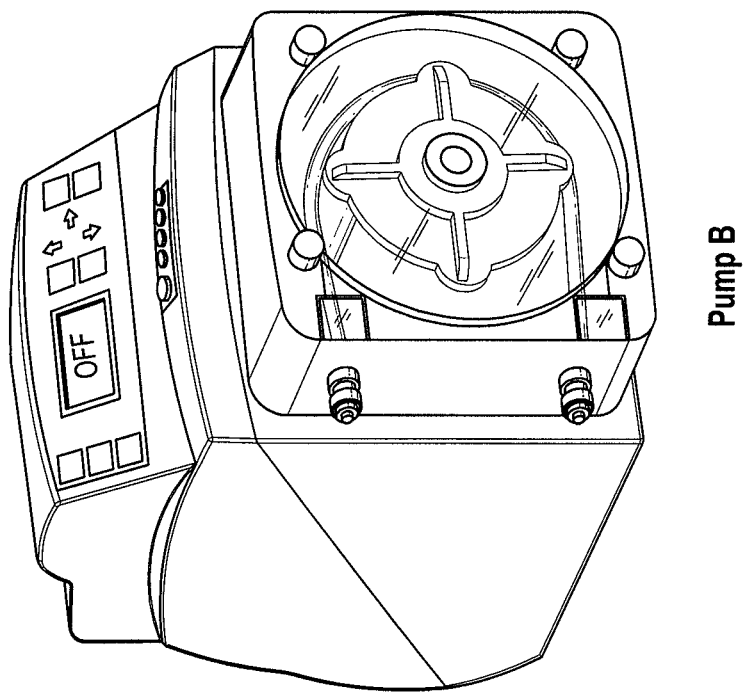
Figure 9:
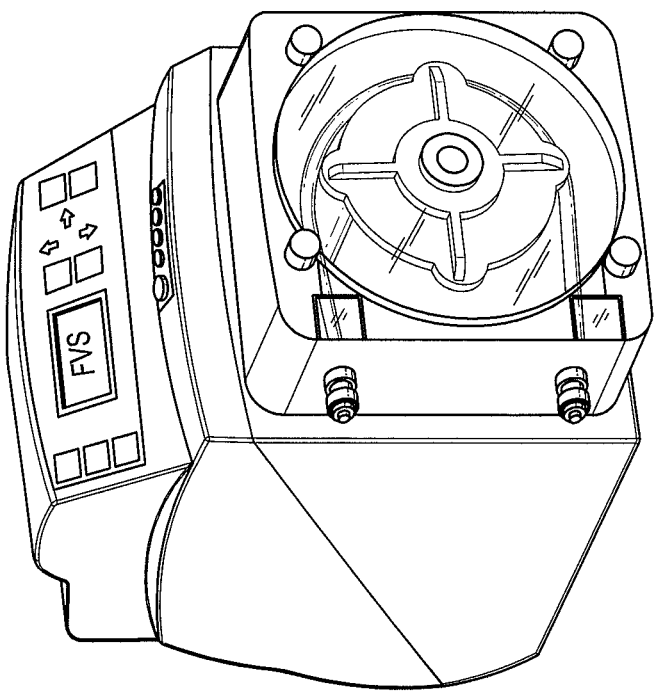
Figure 10:
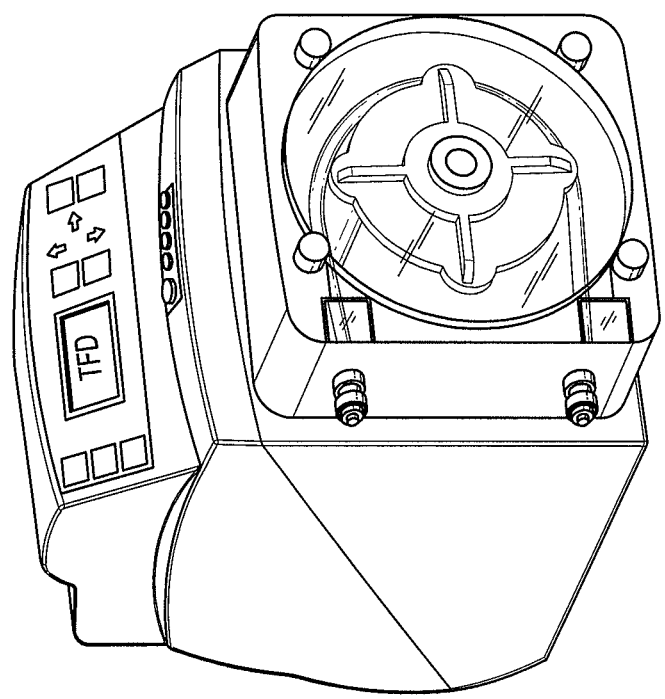
Figure 10:
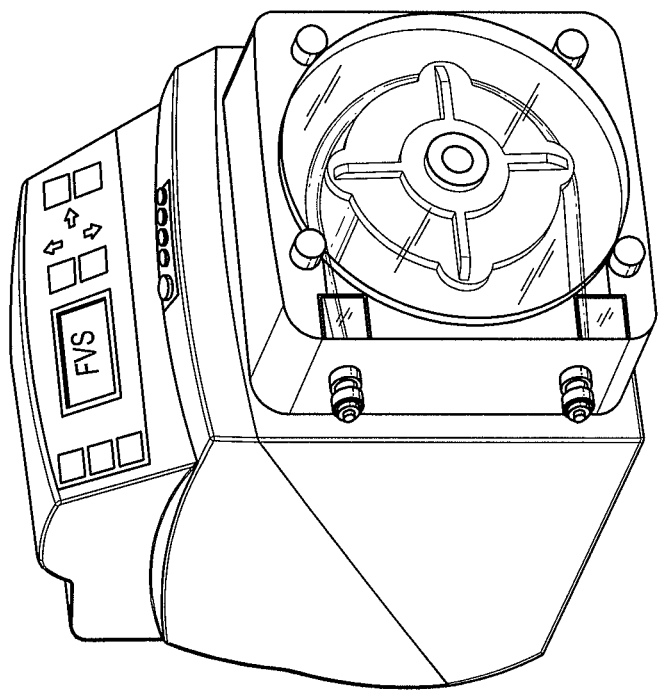

Further, FIGS. 8-10 are views of a system of peristaltic pumps wherein the system is in various operational states, according to an embodiment. As noted above, although a peristaltic pump is shown in some of the embodiments by way of example, other types of pumps, such as metering pumps including diaphragm pumps and piston pumps can also be used in the disclosed embodiments. FIG. 8 illustrates the pumps both being in an operational state in which the pumps are pumping at a desired flow rate. FIG. 9 illustrates pump A with a flow verification sensor ("FVS") delay and pump B being turned "off." In such a situation, the system can be initialized such that pump A can begin pumping while any signal from pump B is delayed or ignored for a given delay period. Thereafter, pump A can receive an output signal from pump B. Finally, FIG. 10 illustrates a scenario in which pump B has experienced tube failure detection ("TFD"). As such, even with the delay at pump A, pump B will not send an enabling signal to pump A due to the malfunction.

Although embodiments of these inventions have been disclosed in the context of certain examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions.

What is claimed is:

1. A system for managing a plurality of components, the system comprising:
a first component responsive to a second signal and continuously providing a first output signal representative of a first operational parameter of the first component during a feedback period, the first component operating during a delay period in which a component other than the first component can be in a non-operating condition; and
a second component continuously providing a second output signal representative of a second operational parameter of the second component during the feedback period, the second component responsive to the first output signal representative of the first operational parameter of the first component;
wherein the first output signal is immediately conveyed over a connections such that the second operational parameter of the second component is managed in response to the first output signal during the feedback period and the second output signal is immediately conveyed by the second component over a connection after the delay period such that the first operational parameter of the first component is managed in response to the second output signal after the delay period.

2. A system as in claim 1, wherein the first operational parameter comprises at least one of a functioning state and a nonfunctioning state.

3. A system as in claim 2, wherein the second operational parameter comprises at least one of a functioning state and a nonfunctioning state.

4. A system as in claim 3, wherein the nonfunctioning state of the first and second components comprises improper functioning of the respective first and second components.

5. A system as in claim 3, wherein the delay period is available only upon initialization of the operational state of the first component while the second component is in the nonfunctioning state.

6. A system as in claim 1, further comprising a third component continuously providing a third output signal representative of a third operational parameter during the feedback period, the third output signal immediately conveyed over a connection such that the second operational parameter is managed in response to the third output signal and the third operational parameter is managed in response to one of the first output signal and the second output signal during the feedback period.

7. A system as in claim 6, wherein the system is configured with the first component operating with the delay period during which a change in the third operational parameter does not cause a change in the first operational parameter and after which a change in the third operational parameter causes a change in the first operational parameter.

8. A system as in claim 1, wherein the delay period corresponds to an amount of time.

9. A system as in claim 8, wherein the delay period further corresponds to an amount of time necessary to complete an operational task.

10. A system for managing a plurality of components, the system comprising:
a master component having an operational state comprising at least an on state and an off state; and
a slave component having an operational state comprising at least an on state and an off state, the slave component receiving a master signal being representative of an operational state of the master component;
wherein the slave component operates in the off state in response to a master signal indicating that the master component is operating in the off state; and
wherein the master component comprises a delay feature that allows the master component to operate in the on state for a given period even if the slave component is in the off state, and wherein after the given period, the master component operates in the off state if the slave component operates in the off state.

11. A system as in claim 10, wherein the system is configured such that the master component sends a master signal to the slave component.

12. A system as in claim 10, wherein the off state of the master and slave components comprises improper functioning of the respective master and slave components.

13. A method for managing a plurality of components, the method comprising:
continuously providing a first output signal from a first component during a feedback period, wherein the first output signal is representative of at least one operating parameter of the first component;
continuously providing a second output signal from a second component during the feedback period, wherein the second output signal is representative of at least one operating parameter of the second component;
immediately conveying the first output signal and managing at least one operational parameter of the second component in response to the first output signal during the feedback period; and
immediately conveying the second output signal after a delay period and managing at least one operational parameter of the first component in response to the second output signal during the feedback period, wherein the first component operates in an on state for a given period during the delay period even if the second component is in an off state.

14. A method as in claim 13, wherein the delay period is shorter than the feedback period.

15. A method as in claim 13, wherein the operational parameter of the first component comprises at least one of a functioning state and a nonfunctioning state.

16. A method as in claim 15, wherein the operational parameter of the second component comprises at least one of a functioning state and a nonfunctioning state.

17. A method as in claim 13, wherein the step of continuously providing a first output signal comprises sending the first output signal to the second component.

18. A method as in claim 17, wherein the step of continuously providing a second output signal comprises sending the second output signal to the first component.

19. A method for managing a plurality of components, the method comprising:
providing a first output signal from a first component during a feedback period, wherein the first output signal is representative of at least one operating parameter of the first component;
providing a second output signal from a second component during the feedback period, wherein the second output signal is representative of at least one operating parameter of the second component;
conveying the first output signal and managing at least one operational parameter of the second component in response to the first output signal during the feedback period;
conveying the second output signal after a delay period and managing at least one operational parameter of the first component in response to the second output signal during the feedback period;
continuously providing a third output signal from a third component during the feedback period;
immediately conveying the third output signal and managing at least one operational parameter of the second component in response to the third output signal during the feedback period; and
during the feedback period, managing at least one operational parameter of the third component in response to one of the first output signal and the second output signal.

20. A method as in claim 19, wherein the step of managing at least one operational parameter of the third component comprises managing at least one operational parameter of the third component in response to the first output signal.

21. A method as in claim 19, further comprising: conveying the third output signal after a delay period for managing at least one operational parameter of the first component in response to the third output signal during the feedback period.

22. A system for managing a plurality of components, the system comprising:

a first component providing a first output signal representative of a first operational parameter during a feedback period, the first component operating during a delay period in which another component can be in a non-operating condition;

a second component providing a second output signal representative of a second operational parameter during the feedback period, the second component receiving the first signal representative of the first operational parameter of the first component; and a third component providing a third output signal representative of a third operational parameter during the feedback period;

wherein the first output signal is conveyed such that the second operational parameter of the second component is managed in response to the first output signal during the feedback period, the second output signal is conveyed after the delay period such that the first operational parameter of the first component is managed in response to the second output signal after the delay period, and the third output signal is conveyed such that the second operational parameter is managed in response to the third output signal and the third operational parameter is managed in response to one of the first output signal and the second output signal during the feedback period.

\* \* \* \* \*

UNITED STATES PATENT AND TRADEMARK OFFICE
CERTIFICATE OF CORRECTION

PATENT NO. : 8,639,363 B2  Page 1 of 1
APPLICATION NO. : 12/973743
DATED : January 28, 2014
INVENTOR(S) : Gledhill, III et al.

It is certified that error appears in the above-identified patent and that said Letters Patent is hereby corrected as shown below:

In the Claims:

In column 10 at line 64, In Claim 1, Change "connections" to --connection--.

Signed and Sealed this
Twenty-first Day of October, 2014

Michelle K. Lee
*Deputy Director of the United States Patent and Trademark Office*